Aug. 8, 1933.　　　　W. S. FEENY　　　　1,921,813

HEAD ROD HOLDER

Filed Nov. 13, 1931

INVENTOR
William S. Feeny
BY
Augustus B. Stoughton
ATTORNEY.

WITNESS:

Patented Aug. 8, 1933

1,921,813

UNITED STATES PATENT OFFICE 1,921,813

HEAD ROD HOLDER

William S. Feeny, Philadelphia, Pa.

Application November 13, 1931. Serial No. 574,742

3 Claims. (Cl. 156—15)

The present invention relates to holders for the head rods of awnings and the like, and its principal object is to provide a comparatively inexpensive, reliable, and simple head rod holder adaptable by a simple adjustment to hold head rods of different sizes.

Stated generally, the invention comprises a base having a tapped pedestal and a concavity constituting a seat for rods of different diameters, a clip having a screw hole, and a screw for detachably mounting the clip on the end of the pedestal, said clip having a shank with substantially parallel faces each adapted to be mounted next to the end of the pedestal, and provided on opposite sides with recessed jaws disposed at different distances from the center line of the faces of the shank of the clip and spaced at different distances from the screw hole.

The invention also comprises the improvements to be presently described and finally claimed.

In the following description reference will be made to the accompanying drawing forming part hereof and in which, Figure 1 is a front view of a head rod holder embodying features of the invention.

Figure 1:
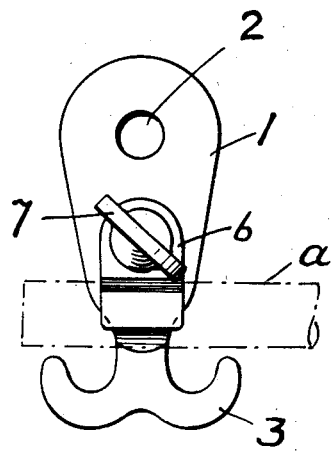
Figure 2:
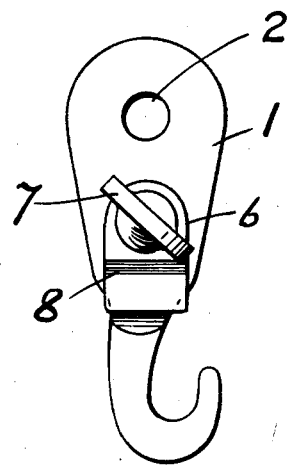
Fig. 2 is a similar view illustrating a modification.
Figure 3:
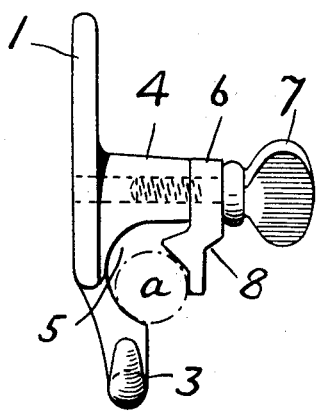
Figs. 3 and 4 are side views respectively showing a relatively small rod and a relatively large rod mounted in the holder.
Figure 4:
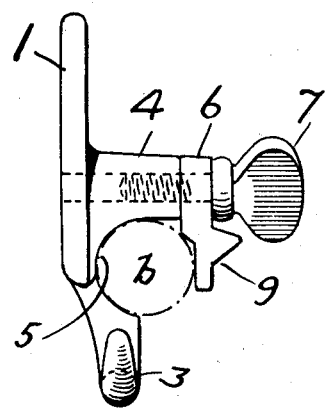

In the drawing, 1 is a base shown as equipped with a screw hole 2 and in Fig. 1 with two hooks 3 and in Fig. 2 with one hook. The base or panel 1 has a tapped post or pedestal 4, and a concavity 5 constituting a seat for rods $a$ and $b$ of different diameters. The concavity 5 is shown as curved or arcuate. 6 is a clip having a screw hole. 7 is a screw for detachably mounting the clips 6 on the end of the pedestal 4. The clip 6 is provided on opposite sides with recessed jaws 8 and 9 disposed at different distances from the center line of the faces of the shank of the clip and spaced at different distances from the screw hole through the shank of the clip. The jaws 8 and 9 are shown to comprise two flat faces angularly arranged. A rod $a$ of small diameter, Fig. 3, is clamped between the recessed jaw 9 and a portion of the face of the concavity or jaw 5. To put a rod $b$ of larger diameter into the holder the set screw 7 is removed and the clip is detached and turned over, and the set screw 7 replaced, so that the rod is engaged by the recessed jaw 8 and a more extensive portion of the concavity or jaw 5.

It will be obvious to those skilled in the art to which the invention relates that modifications may be made in details of construction and arrangement and matters of mere form without departing from the spirit of the invention which is not limited to said matters or otherwise than the prior art and the appended claims may require.

I claim:

1. A head rod holder comprising a base having a tapped pedestal and a concavity, a clip having a screw hole, and a screw for detachably mounting the clip on the pedestal, said clip having a shank with substantially parallel faces and provided on opposite sides with recessed jaws disposed at different distances from the center line of the faces of the shank and spaced at different distances from the screw hole and adapted to be reversed to clamp head rods of different diameters in said concavity.

2. A head rod holder comprising a base having a rod holding jaw and a detachable clip having differently spaced concave jaws on its opposite sides and each adapted to be operated with a different portion of the jaw on the base.

3. A head rod holder comprising a base having a rod holding jaw, and a detachable clip having jaws on its opposite sides so arranged that said clip is adapted to be reversibly mounted on said base for providing different spaces between said rod holding jaw and the opposite jaw on said clip for clamping head rods of different diameters therebetween.

WILLIAM S. FEENY.